(12) United States Patent
Carlsen

(10) Patent No.: US 6,236,443 B1
(45) Date of Patent: *May 22, 2001

(54) DISPLAY WITH ICON ROW

(75) Inventor: Sten Carlsen, Rødovre (DK)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,826

(22) Filed: Feb. 3, 1998

(30) Foreign Application Priority Data

Feb. 5, 1997 (GB) .................................. 9702292

(51) Int. Cl.⁷ .................................. G02F 1/1343
(52) U.S. Cl. .................................. 349/143; 349/142
(58) Field of Search .................. 349/68, 139, 142, 349/143; 345/127, 128, 131

(56) References Cited

U.S. PATENT DOCUMENTS

| | | | |
|---|---|---|---|
| 4,289,383 | * 9/1981 | Schwarzschild | 349/68 |
| 4,412,214 | * 10/1983 | Tanaka et al. | 349/142 |
| 4,435,046 | 3/1984 | Nishimura | 350/334 |
| 4,481,511 | * 11/1984 | Hanmura et al. | 345/100 |
| 4,630,122 | * 12/1986 | Morokawa | 349/143 |
| 4,764,766 | * 8/1988 | Aoyama et al. | 349/143 |
| 5,016,002 | 5/1991 | Levanto | 345/33 |
| 5,513,027 | 4/1996 | Paratte | 349/139 |
| 5,903,327 | * 5/1999 | Hijii | 349/73 |

FOREIGN PATENT DOCUMENTS

| | | |
|---|---|---|
| 0652460 | 5/1995 | (EP) . |
| 2 028 547 | 3/1980 | (GB) . |
| 2 119 994 | 11/1983 | (GB) . |
| 2291239 | 1/1996 | (GB) . |

OTHER PUBLICATIONS

European Search Report Van Roost, L Dec. 22, 1999 Place of Search: The Hague 1 page.

\* cited by examiner

*Primary Examiner*—William L. Sikes
*Assistant Examiner*—Dung Nguyen
(74) *Attorney, Agent, or Firm*—Perman & Green, LLP

(57) ABSTRACT

A display of dot matrix type is used in a portable telephone. The display is divided into a primary display area to show alphanumeric signs and the like, and into an icon area to show predetermined icons. Both display areas show signs by selectively marking a plurality of dots. The primary display area (the dot matrix area) is a so-called graphic display, in which the dots are regular and may be combined to form arbitrary signs. In the icon display area, the dots are shaped according to the icons. The dots are hereby icon-specific, and their irregular shape occurs in practice by slitting the icon concerned in the transverse direction. The icon area will hereby electrically serve as one or more edge rows in the dot matrix area.

8 Claims, 1 Drawing Sheet

DISPLAY WITH ICON ROW

BACKGROUND OF THE INVENTION

The invention relates to a display of a dot matrix type and to a telephone having such a display.

An LCD display is used in connection with e.g. portable telephones as part of the user interface of the telephone to display various items of information, such as entered numbers, telephone status and menus. In addition to these varying data, the display shows a plurality of different icons. These icons may comprise a battery bar, a signal strength bar, and icons for data call, fax call, voice mail, etc.

The desire of showing ever more items of information in the display involves a need for a larger display area. In a dot matrix LCD display, a dot is produced by establishing a voltage difference across a voltage-sensitive medium by means of two electrodes. These electrodes are arranged as intersecting paths or wires (x, y) connected to respective x, y drivers along the edges of the display. In addition to the need for a larger display area, the users also want the telephones to be of minimized volume. It being known that the display must be capable of showing a plurality of different icons informing the user of various states, many manufacturers have decided to establish icon rows in which individual dots are designed in accordance with what the icon is to show, e.g. "ABC" or a telephone. This is an excellent solution, since an icon appears as a single dot, which saves connections.

However, the icon row involves the problem that no connecting lines or wires can be run past the icon row, and such wires must instead be run on the opposite display edge. If it is desired to arrange the icon row above the dot matrix area in a telephone, the wires from the dot matrix area to the display drivers on the glass discs must be run below this. As a consequence, a dead zone in which no other activities can take place, will be formed below the dot matrix area. This dead zone will typically be positioned in the transition between display and keypad. This is extremely unfortunate, since a telephone frequently comprises one or more mode-specific keys whose function is shown in the display—separated by this dead zone.

SUMMARY OF THE INVENTION

In accordance with the invention there is provided a display of a dot matrix type comprising a voltage-sensitive medium in connection with primary and secondary groups of conductive paths, wherein the optical state of the voltage-sensitive medium change locally to form a plurality of dot areas when a voltage difference is established by means of said conductive paths, wherein a first group of said dot areas is arranged in a pattern of substantially uniform dots to form a primary display area to display alphanumeric signs and the like, and wherein a second group of said dot areas is arranged in a predetermined pattern to form an icon area to display predetermined icons, the shape of the dot areas in one direction being adapted to the dot size in the primary display area and being adapted to the shape of the icons in another direction.

The display can accordingly have an icon row arranged such that the wires from the dot matrix area to the display drivers or controller may be run through the icon row.

The icon area will hereby serve as one or more rows in the dot matrix display in an electrical respect, and the conductive paths to this area are naturally run through the icon area and are also used for selecting dots to form the icons. The icon row will thus have the resolution of the dot matrix display in one direction. Dots will extend transversely to this direction in the entire width of the icon or in a considerable part thereof. Thus, the invention makes it possible to obtain the traditional system advantages of the icon row—viz. a small number of selectable dots having a good graphic appearance, combined with the possibility of allowing wires from the dot matrix area to pass through the icon area. The invention moreover relates to a portable telephone comprising a display of the above-mentioned type.

BRIEF DESCRIPTION OF THE DRAWINGS

The invention will be explained more fully below in connection with preferred embodiments and with reference to the drawing, in which.

DETAILED DESCRIPTION OF THE INVENTION

Figure 1:
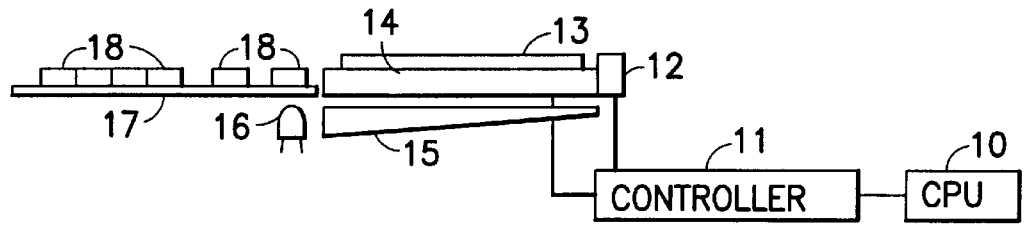
FIG. 1 is a schematic lateral view of a preferred embodiment of a display according to the invention used in a portable telephone.

In the preferred embodiment, the conductors in the primary and secondary groups of conductive paths, like known LCD displays, will be arranged as parallel paths in which the points of intersection form electrodes or switches. The paths from the two groups extend transversely to each other, with the voltage-sensitive medium disposed between them. Thus, it is the extent of the electrodes or the switches which determines the shape of the dots in the display.

The display will preferably be a back-lighted display in which the primary and secondary groups of conductive paths are disposed on respective substrate discs, preferably of glass, and which is moreover provided with respective polarizers having intersecting polarization directions, and wherein the voltage-sensitive medium is a liquid crystal (twisted nematic) which, upon application of a voltage, changes the polarization of light passing through the crystal. This type of material (TN) is available in several forms (STN, DSTN, MSTN, etc.) having various optical properties which allow i.a. an increased view angle.

According to the invention, dots are shaped in the icon area according to the icons which they are to show. Their height is given by the height of the icons according to FIG. 3, while their width mainly corresponds to the dot width in the primary display area. If the icon had been shown in the primary display area, it would have had to be composed of a large amount of regular dots of point shape, while the icon when shown in the icon area is composed of a large number of dots "tailored" to the icon concerned, so that will be divided by a large number of thin lines which are not visible to the naked eye in practice. The icon area will hereby serve as one or more rows in the dot matrix display in an electrical respect, and the conductive paths to this area are naturally run through the icon area and are also used for selecting dots to form the icons. The icon row will thus have a resolution corresponding the dot matrix display in one direction. Dots extend transversely to this direction in the entire width of the icon or in a considerable part of it. Thus, the invention makes it possible to obtain the traditional system advantages of the icon row—viz. a small number of selectable dots having a good graphic appearance, combined with the possibility of allowing wires from the dot matrix area to pass through the icon area.

The conductors in the primary and secondary groups of conductive paths are arranged as parallel paths in which the points of intersection form electrodes or switches. The paths from the two groups extend transversely to each other, with the voltage-sensitive medium disposed between them. Thus, it is the extent of the electrodes or the switches which determines the shape of the dots.

The invention will be described more fully below by way of example in connection with FIGS. 1 and 2. An LCD display module of the invention is used in the preferred embodiment in a portable telephone. The telephone has a CPU 10 which controls the communication of the telephone with the network with which it communicates. In addition, the CPU 10 controls the user interface of the telephone— including an LCD display 14. The connection between the CPU 10 and the display 14 is via a controller 11 which is mounted onboard, and which serves as an interface between the CPU 10 and two drivers 12, 13 for the rows and columns in the display 14. Otherwise, it will be rather time-consuming to control the drivers 12, 13 directly from the CPU 10, and it will moreover take some programming. The reason is that each bit (dot/pixel) is to be written separately or as quite small groups of e.g. 4 bits per time in a non-stop cycle. When the display 14 has a limited number of rows and columns (e.g. below 200 in all), the controller 11 and the drivers 12, 13 may be integrated in one and the same chip. Correspondingly, it may be necessary to increase the number of drivers if the display is very large.

The controller 11 is responsible for i.e. the generation of characters and for the continuous update of the display 14. The generation of characters, however, may advantageously be included in the MCU (not shown) of the telephone chip set. The controller 11 has an associated (preferably on chip) RAM which is used as a buffer for data from the CPU 10 during the above-mentioned cycle.

In the preferred embodiment, the display 14 will be back-lighted by a plate-shaped lightguide 15 arranged behind the LCD display 14 and in parallel with it. The side of the lightguide 15 facing the LCD display 14 is formed with radiation-increasing elements, such as roughnesses in the surface acting as integrated microlenses, or with a holographic element to increase the radiation in the normal direction of the lightguide. The lightguide 15 will advantageously be edge-lighted by a plurality of light emitting diodes 16 (LED) and be edge-shaped—converging away from the lighted edge. Uniform radiation from the lightguide may hereby be achieved by increasing the relative radiation with the distance from the lighted edge.

A keypad 17 having a plurality of keys 18 may adjoin the primary display area of the display 14, the driver 12 of the telephone matrix dots addressed in the longitudinal direction of the telephone being arranged above the display 14. The CPU 10 may hereby show the function of keys 19 in the keypad 14 in predetermined areas 20 close to the key 19 concerned if its function depends on the mode of the telephone. In the preferred embodiment, these predetermined areas 20 will be positioned at the bottom in a primary display area 21 designed as a dot matrix display having regular (e.g. rectangular or square) dots 27. Above the primary display area 21 is an icon area 22 which, in the preferred embodiment, may be regarded electrically as an integrated part of the primary display area 21, as dots in the icon area 22 may be regarded as rows of dots of an irregular shape; their extent in one direction corresponds carefully to that of the other dots in the primary display area 21, while their extent in the transverse direction is icon-specific.

Figure 3:
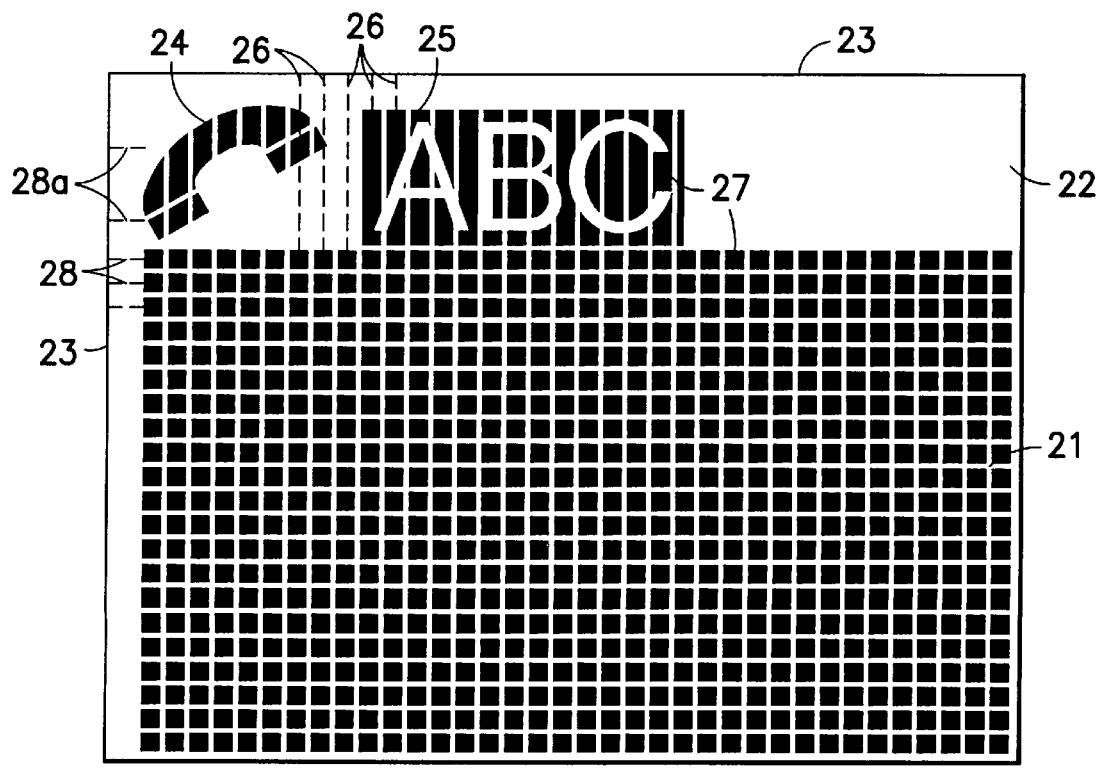
FIG. 3 is a schematic view of the structure of a preferred embodiment of the primary display area and icon area of the display according to the invention.

FIG. 3 schematically illustrates a preferred embodiment of a display image of the invention. In the preferred embodiment, the primary display area 21 will be shaped as full graphic dot matrix display with e.g. 50×100 dots and will have an area of 16×32 mm, which gives a resolution of about 80 dpi. Dots 27 in the icon area 22 are irregular in shape, and it will be seen that some icons need more dots transversely to the icon row in order to be displayed. The resolution in the longitudinal direction of the icon row corresponds to the resolution in the primary display area, while the resolution in the transverse direction varies.

Two icons 24 and 25 are shown, and it will be seen how wires 26 in one direction pass through dot segments in the icons 24, 25 or merely between the icons. Wires 28 extend in a second direction transverse to the wires 26. The wires 28 pass through both the icon area 22 and the primary display area 21. A group 28a of the wires 28 pass solely through the icon area 22 without passing through the primary display area 21. Display drivers 12, 13 are arranged along the two edges 23 on the display 14.

Figure 2:
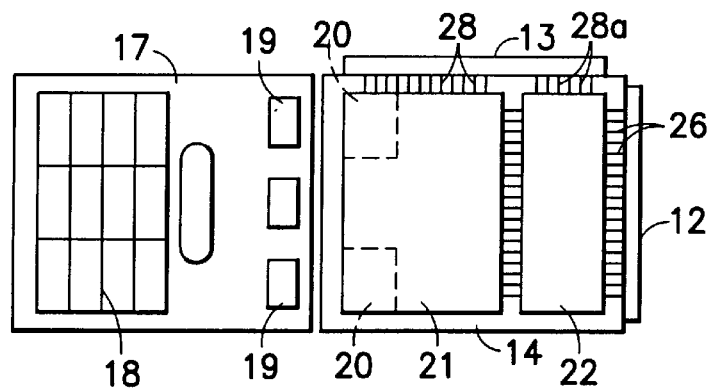
FIG. 2 is a schematic front view of the embodiment shown in FIG. 1.

It should be noted that the internal light source 15, 16 shown in FIG. 1 may easily be modified to utilize incident light instead. This merely requires that the rear glass disc, instead of being formed with a polarizer having an axis of polarization perpendicular to the axis of polarization of the polarizer on the front glass disc, is provided with a metallic polarizer which, with maintained polarization, reflects the light back through the liquid crystal. The light will thus pass the same polarizer twice, and it will be the influence of the crystal on the polarization of the light en route which will determine which dots are to be dark and light.

It is thus clear that the expression "optical property" or "optical state" is to be interpreted rather broadly in this context. The preferred embodiment uses a voltage-sensitive crystal to change the polarization of the light in a polarizer structure. The same effect may be obtained by controlling the transmission properties of a voltage-sensitive material (high/low absorption) in response to applied voltage. Finally, the voltage-sensitive material itself may generate the light, as it may be electroluminescent (emit light locally when a voltage is applied locally).

The present invention can provide a display comprising an optical layer, the optical state thereof being sensitive to the potential difference across the layer, and conductive electrodes connected to the optical layer for providing the potential difference. The display has a first region and a second icon region. The first region provides a substantially regular matrix capable of displaying images in dependence on the local potential difference across the optical layer at respective elements of the matrix. The second icon region is for displaying predetermined icons. Icons in the icon region are formed from discrete regions aligned in a direction with respective rows or respective columns of the matrix. The discrete regions take the form of the icon to be displayed along the direction of alignment.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A display of a dot matrix type, comprising a voltage-sensitive medium in connection with primary and secondary groups of intersecting conductive paths, wherein an optical state of the voltage-sensitive medium is changed locally to form a plurality of dot areas when a voltage difference is established by means of said intersecting, conductive paths, wherein a first group of said dot areas is arranged in a substantially uniform pattern of dots to form a primary display area to display alphanumeric signs, wherein a second group of said dot areas is arranged in a predetermined pattern to form an icon area to display predetermined icons, a first display dimension of the dot areas of the second group in one direction being substantially a same size as a first display dimension of the dot areas of the first group in the primary display area, and a second display dimension of the dot areas of the second group being adapted to the shape of the icons in another direction, wherein the primary group of conductive paths passes through both the primary display area and the icon area forming the alphanumeric signs in the primary display area and the icons in the icon area, while at least one conductive path of said secondary group of conductive paths passes through the icon area without passing through the primary display area, wherein the conductive paths of the primary group of conductive paths passing through both the primary display area and the icon area are integrated into the second group of dot areas, and wherein the conductive paths of the primary group of conductive paths passing through both the primary display area and the icon area are formed as straight paths passing through an entire active display area constituted by said primary display area and said icon area.

2. A display according to claim 1, wherein the icon area comprises a line of dots, and wherein the second display dimension of a group of dots in the icon area transverse to the line corresponds to a size of an icon which may displayed by the group of dots.

3. A display according to claim 1, wherein the primary group of conductive paths between the primary display area and an associated driver pass through the icon area.

4. A display according to claim 1, wherein the icon area is handled electrically as a dot line of the primary display area.

5. A display according to claim 1, wherein the conductors in the primary and secondary groups of conductive paths are arranged as respective parallel paths, wherein intersection points between two of the conductors from the primary and secondary groups of conductive paths, respectively, form electrodes, and wherein the voltage-sensitive medium is disposed between the paths of the two groups of conductive paths.

6. A display according to claim 1 wherein a majority of the conductive paths of the primary group of the conductive paths pass through the icon area for forming the second group of the dot areas.

7. A display comprising an optical layer, an optical state thereof being sensitive to a potential difference across the layer, and conductive electrodes connected to the optical layer for providing the potential difference, the display having a first region providing a substantially regular matrix capable of displaying images in dependence on the local potential difference across the optical layer at respective elements of the matrix and a second icon region for displaying predetermined icons, icons in the icon region being formed from discrete regions aligned in a direction with respective rows or respective columns of the matrix, the discrete regions taking the form of the icon to be displayed along the direction of alignment, wherein a dimension of the discrete regions transverse to the direction being a same size as a dimension transverse to the direction of the respective row or column of the matrix, wherein a primary group of the conductive electrodes pass through both the first and second regions for forming the images in the first region and the icons in the second region, wherein the conductive paths of the primary group of conductive paths passing through both the first and second regions are integrated into the discrete regions in the second icon region, and wherein the conductive paths of the primary group of conductive paths passing through both the first and second regions are formed as straight paths passing through an entire active display area constituted by said first and second regions.

8. A portable telephone comprising a dot matrix display comprising a voltage-sensitive medium in connection with primary and secondary groups of intersecting, conductive paths, wherein an optical state of the voltage-sensitive medium is changed locally to form a plurality of dot areas when a voltage difference is established by means of said intersecting conductive paths, wherein a first group of said dot areas is arranged in a substantially uniform pattern of dots to form a primary display area to display alphanumeric signs, wherein a second group of said dot areas is arranged in a predetermined pattern to form an icon area to display predetermined icons, a first display dimension of the dot areas of the second group in one direction being a same size as a first display dimension of the dot areas of the first group size in the primary display area, and a second display dimension of the dot areas of the second group being adapted to the shape of the icons in another direction, wherein said primary group of conductive paths passes through both the primary display area and the icon area forming the alphanumeric signs in the primary display area and the icons in the icon area, while at least one conductive path of said secondary group of conductive paths passes solely through the icon area, wherein the conductive paths of the primary group of conductive paths passing through both the primary display area and the icon area are integrated into the second group of dot areas, and wherein the conductive paths of the primary group of conductive paths passing through both the primary display area and the icon area are formed as straight paths passing through an entire active display area constituted by said primary display area and said icon area.

* * * * *